(12) United States Patent  (10) Patent No.: US 7,448,457 B2
Durif (45) Date of Patent: Nov. 11, 2008

(54) HEAVY VEHICLE

(75) Inventor: Pierre Durif, Enval (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 11/331,289

(22) Filed: Jan. 12, 2006

(65) Prior Publication Data

US 2006/0113124 A1 Jun. 1, 2006

Related U.S. Application Data

(63) Continuation of application No. PCT/EP2004/007661, filed on Jul. 12, 2004.

(30) Foreign Application Priority Data

Jul. 17, 2003 (FR) .................................. 03 08753

(51) Int. Cl.
*B62D 61/10* (2006.01)
(52) U.S. Cl. ........................ 180/22; 180/23; 180/24.03; 180/383; 301/36.1; 301/36.2
(58) Field of Classification Search ................... 180/22, 180/23, 24.03, 248, 383; 301/36.1, 36.2
See application file for complete search history.

(56) References Cited

U.S. PATENT DOCUMENTS 4,181,315 A * 1/1980 van der Lely ............... 280/834

| | | | |
|---|---|---|---|
| 6,148,940 A | 11/2000 | Leisenring et al. | |
| 6,148,941 A * | 11/2000 | Hinton et al. | 180/65.5 |
| 6,419,325 B1 * | 7/2002 | Bowman et al. | 301/36.2 |
| 2002/0046794 A1 | 4/2002 | Durif | |

FOREIGN PATENT DOCUMENTS

| FR | 1 154 774 | | 4/1958 |
|---|---|---|---|
| FR | 2 543 094 A | | 9/1984 |
| FR | 2 551 016 A | | 3/1985 |
| GB | 2136749 A | * | 9/1984 |
| WO | WO 00/71365 A | | 11/2000 |

OTHER PUBLICATIONS

Huffman, John Pearley, "Specialty File: Caterpillar 797", Car and Driver, May 2000.*
Wiebusch, Bruce, "Six-ton tires keep cool with grooves", Design News, Sep. 23, 2002.*
NMA Mining Week, Jun. 4, 2004; vol. 10, Issue 22, p. 2.*
"Caterpillar 797B Mining Truck Specifications", Dec. 2003, Caterpillar, USA, pp. 1-19.

* cited by examiner

*Primary Examiner*—Eric Culbreth
(74) *Attorney, Agent, or Firm*—Cohen Pontani Lieberman & Pavane LLP

(57) ABSTRACT

A heavy vehicle of a mass greater than 40 metric tons and operable to generate a motive power is disclosed. The vehicle includes a first axle, at least two first tires mounted on the first axle, a second axle for transmitting at least part of the motive power, and four second tires mounted on the second axle. At most two of the second tires are driving or motive power transmitting tires. Each of the second tires is associated with a respective braking device.

14 Claims, 2 Drawing Sheets

HEAVY VEHICLE

CROSS-REFERENCE TO RELATED APPLICATIONS

This application is a U.S. Continuation Application of International Application PCT/EP2004/007661 filed Jul. 12, 2004.

BACKGROUND OF THE INVENTION

1. Field of the Invention

The invention relates to a heavy vehicle such as a transport vehicle or a "civil engineering" vehicle, of a mass greater than 40 metric tons.

Although not limited to such applications, the invention will be described more particularly with reference to a heavy vehicle, such as a transport vehicle or a "civil engineering" vehicle, of a mass greater than 500 metric tons, fitted with tires of a diameter greater than three meters fifty having an axial width greater than 37 inches.

2. Description of the Related Art

Such vehicles, generally designed for carrying heavy loads, comprise a front steering axle comprising two steering wheels and a rear axle, which is most frequently rigid, comprising four driving wheels distributed in pairs on each side.

An axle is defined as an assembly of the elements enabling the fixed structure of the vehicle to be connected to the ground.

The axial or transverse direction of the tire is parallel to the axis of rotation of the tire.

The circumferential direction of the tire, or longitudinal direction, is the direction corresponding to the periphery of the tire and defined by the rolling direction of the tire.

The axis of rotation of the tire is the axis around which it turns in normal use.

In the case of vehicles, in particular intended for use in mines or quarries for transporting loads, the problems of access and demands of production lead the manufacturers of these vehicles to increase their loading capacity. It follows that the vehicles become ever larger and thus ever heavier in themselves and are capable of transporting an ever greater load. The current masses of these vehicles may reach several hundred metric tons, the same being true of the load to be transported; the total mass may reach 600 metric tons.

Since the loading capacity of the vehicle is directly linked to that of the tires, it is known that, to increase this loading capacity, it is necessary to increase the amount of air contained in the tires.

At present, as stated above, vehicles of this type, such as dumpers used in mines, comprise a rear axle on which are mounted four wheels, arranged in pairs, to respond to these demands.

Furthermore, the dimensions of said wheels and consequently those of the tires and in particular the rigidity of the lower zones require said wheels to be made in several parts to allow mounting of the tire on a rim. The operations involved in mounting and demounting said tires in the event of replacement or maintenance are long and tedious. The number of clamping parts which have to be handled during these operations may be greater than 200, and very high levels of clamping torque are associated therewith. The time taken for these operations is consequently long and therefore detrimental to the productivity sought during exploitation of said mines.

Since current demands tend towards a constant increase in the loading capacity of these vehicles, the various parameters listed above have resulted in widening of the tires so as to increase the volume of air therein. At around 4 meters, tire diameter is now such that it is virtually impossible to increase it further, in particular for reasons of transportation of said tires. In fact, the dimensions of said tires will be limited by transportation thereof, in particular by road widths and bridge headroom. It is likewise virtually impossible to decrease the rim diameter, which in particular allows positioning of the driving torque transmission system and of the braking systems.

During their studies, the inventors have succeeded in demonstrating that these "widened" tires do effectively allow an increase in transported load but exhibit various drawbacks. Tests have in fact shown that the wear resistance of these tires is reduced, in particular with respect to the axially outer tires mounted on the rear axle. And more frequent tire changes reduce the efficiency of said vehicles.

Furthermore, patent application WO 00/71365 describes a method making it possible to simplify tire mounting, the latter being mounted directly on the hub, which serves as the rim. Independent rings then act as rim seats and are held in place by locking rings, which are connected firmly to the hub as a result in particular of being complementary in profile.

SUMMARY OF THE INVENTION

The inventors thus set themselves the task of improving the properties of the tires of these heavy vehicles in terms of wear with regard to those of current tires, in particular with a view to improving vehicle efficiency.

This aim is achieved according to the invention by a heavy vehicle, such as a transport vehicle or a "civil engineering" vehicle, of a mass greater than 40 metric tons, comprising a steering axle provided with at least two tires and a driving axle by which is transmitted at least part of the motive power, the driving axle comprising four tires, for example associated in pairs on either side of the axle in conventional configurations, at most two tires of the driving axle permanently transmitting at least part of the motive power and at least the tires of the driving axle being individually associated with a braking device.

This aim is achieved according to the invention in the same way in the case of a heavy vehicle of a mass greater than 500 metric tons, such as a transport vehicle or a "civil engineering" vehicle, fitted with tires of radial structure of a diameter greater than 3.5 meters having an axial width greater than 37 inches, and comprising a front steering axle provided with at least two tires and a rear driving axle by which is transmitted at least part of the motive power, the rear driving axle comprising four tires, at most two tires permanently transmitting at least part of the motive power and at least the tires of the driving axle being individually associated with a braking device.

Also advantageously according to the invention, the tires of the steering axle are individually associated with a braking device.

According to a preferred embodiment of the invention, the axially inner tires fitted on the driving axle permanently transmit at least part of the motive power.

According to the invention, the driving axle comprises four tires and preferably the two axially outer tires of the driving axle, which advantageously do not transmit the motive power, have as their only essential function that of bearing part of the load. Such an embodiment makes it possible to reduce the longitudinal stresses arising in particular when the vehicle follows the course of a bend. In fact, when a vehicle comprising at least twin tires follows the course of a bend, the tires which are axially furthest to the outside cover a greater distance if positioned on the outside of the bend and a smaller distance if positioned on the inside of the bend. This phenomenon is accentuated in the context of the invention by the width of the tires.

Furthermore, according to the invention, the tires are individually associated with a braking device in such a way as to make it possible to slow down or stop this type of vehicle under the best conditions, irrespective of the conditions of use of the vehicle at the moment of braking and, in particular, when the vehicle is on a bend or alternatively when it is on a slope. This association of a braking device with each of the tires also makes it possible to limit wear to the tires and to improve distribution of the wear, caused by braking, between the various tires. The invention thus makes it possible, in fact, to prevent more pronounced wear to certain tires if they were the only ones associated with a braking device. The wear caused by braking is particularly marked in the case of vehicles of the dumper type, which have to follow sloping courses with large loads, requiring long and continuous braking.

It would appear, moreover, that the use of four tires on the driving axle is not favorable to efficiency when it is necessary to replace a tire, if they are mounted on independent wheels. In fact, in particular when it is necessary to change a tire which is located axially to the inside relative to the others, it is necessary to remove a first wheel in order to gain access to the second before engaging in the replacement procedure; this therefore involves a large number of operations and is not therefore favorable to vehicle efficiency.

The invention thus proposes advantageously to combine the vehicle as defined above with wheel-less mounting on the driving axle, the tires being set in place on the axle provided to this end through the intermediary of first mounting rings forming the tire bead seats and second locking rings ensuring positioning of said first rings and therefore of the tires. Mounting of this type has already been described in above-cited patent application WO 00/71365. According to this embodiment, the invention requires that recesses be provided on the hub to accommodate the locking rings, positioning of two of these rings being necessary per tire.

A variant embodiment of the invention also provides for the tires of the steering axle advantageously to transmit part of the motive power.

According to an advantageous embodiment of the invention, the steering axle comprises four tires, at least two tires of said steering axle transmitting part of the motive power, as stated above in the case of the driving axle. Preferably, the two axially inner tires are preferably the tires transmitting the motive power.

According to such an embodiment, the invention additionally advantageously provides, as described above in the case of the driving axle, for the tires to be mounted in wheel-less manner, said tires being set in place on the hub provided to this end through the intermediary of first mounting rings forming the tire bead seats and second locking rings ensuring positioning of said first rings and therefore of the tires, according to a method such as that described in patent application WO 00/71365 cited above. According to this embodiment, the invention requires that four recesses be provided on the steering hub on either side to accommodate the locking rings, positioning of two of these rings being necessary per tire.

Another variant embodiment of the invention provides for at least two tires of the driving axle, preferably the tires of the driving axle axially to the outside, not to transmit the motive power solely when the vehicle is following a trajectory which is not rectilinear, or preferably when it is following a bend whose radius of curvature is less than a predetermined value. Such an embodiment may be achieved by a decoupling device between said tires and the members transmitting the motive power. Such a device may be controlled by the vehicle's steering members according to any means known to the person skilled in the art.

In the same manner, the invention advantageously provides for the variant in which at least two tires of the steering axle transmit part of the motive power to take effect only when the vehicle is following a trajectory which is not rectilinear, or preferably when it is following a bend whose radius of curvature is less than a predetermined value.

According to other variant embodiments of the invention, when all the tires on the steering axle transmit at least part of the motive power, said steering axle is equipped with one or more devices allowing different speeds of rotation to be imparted to the different tires, said speeds being adapted in particular to limit the wear of the various tires, in particular when taking bends.

Such a variant embodiment provides, for example, for the tires of the steering axle all to participate in transmission of the motive power through the intermediary of devices, such as differential gears, which control the involvement of each of the tires as a function of the travel conditions of the vehicle.

The invention also provides for a vehicle such as described above, each of whose tires is associated with an electric motor, for example incorporated in the wheel associated with the tire or in the axle hub in the vicinity of a tire in the case of an embodiment according to the method described in document WO 00/71365 described above.

According to this embodiment, the use of electric motors associated with a tire makes it possible to distribute the motive power variably as a function of the tires and of the trajectory followed.

In the same manner, the invention also provides for some only of the tires transmitting the motive power to be controlled by electric motors; these tires may for example be the tires of the front axle, those of the rear axle being associated with conventional motorization and transmission.

When the motive power is due only to the electric motors, the invention also provides for certain ones only of the tires to be associated with such electric motors and for the other tires to have only load-bearing as their essential function.

BRIEF DESCRIPTION OF THE DRAWINGS

Other advantageous details and features of the invention will become clear below from the description of examples of embodiment of the invention made with reference to FIGS. 1 and 2, in which.

To simplify understanding thereof, the Figures are not to scale. The Figures show only half of the vehicles, which extend symmetrically relative to the axis XX', which represents the longitudinal median plane of the vehicle.

DETAILED DESCRIPTION OF THE PREFERRED EMBODIMENTS

Figure 1:
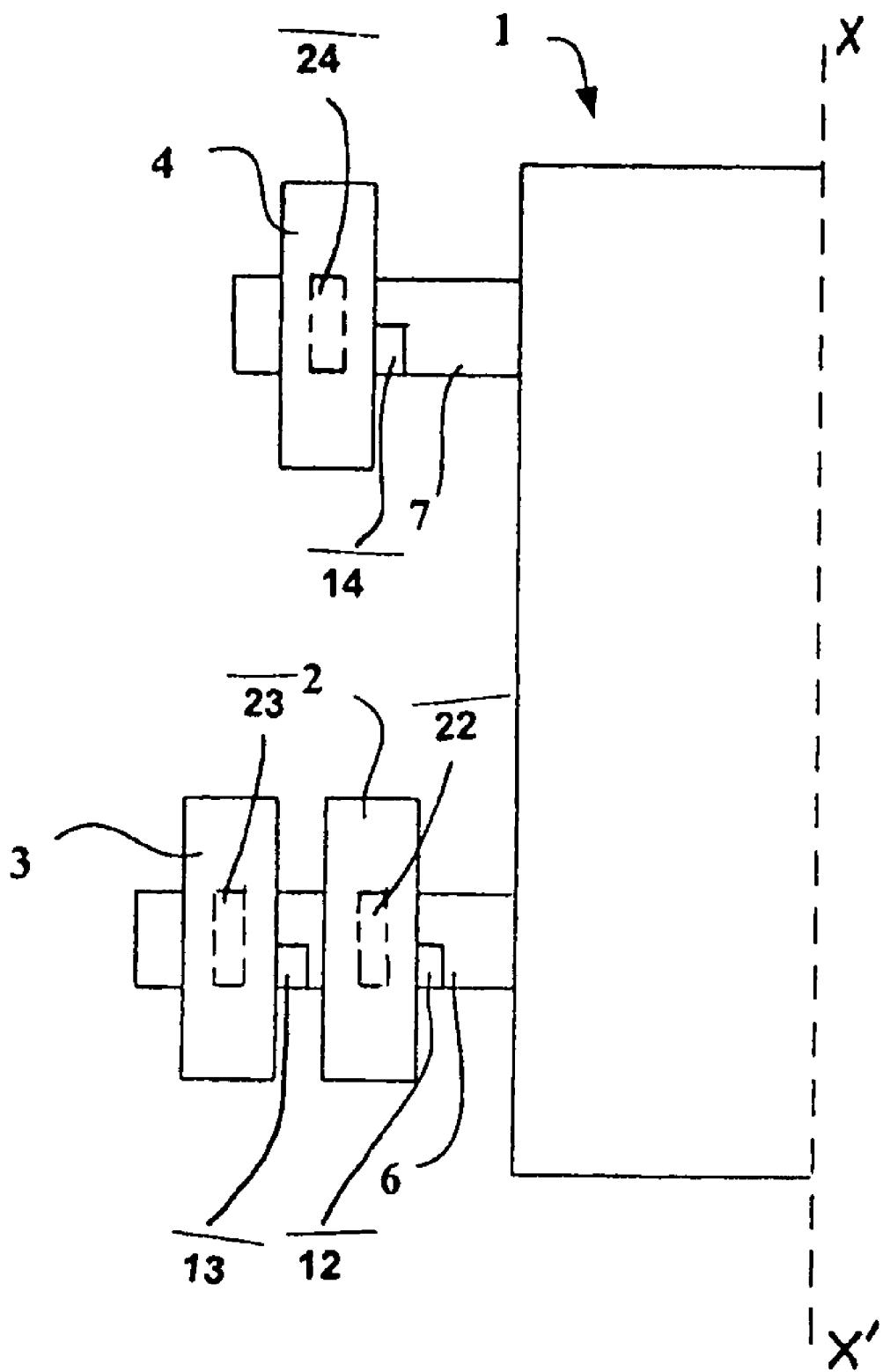
FIG. 1 shows a diagram, viewed from above, of a vehicle according to the invention.

FIG. 1 is a diagrammatic representation of a half-vehicle 1 configured in accordance with the invention and comprising four tires on the rear driving axle 6 and two steering tires on the front steering axle 7. Since the Figure shows only half of the vehicle, only two tires 2, 3 are shown on the rear axle 6 and one tire 4 on the front axle 7.

The vehicle 1 shown diagrammatically in this FIG. 1 is a heavy vehicle having a total loaded weight of the order of 600 metric tons.

The tires with which the vehicle is fitted are large tires whose aspect ratio H/S is 0.80, H being the height of the tire on the rim and S the maximum axial width of the tire when the latter is mounted on its service rim and inflated to its recommended pressure. The tires are of dimension 59/80R63.

These tires comprise a radial carcass reinforcement composed of inextensible metal cables of steel, oriented radically and anchored in each tire bead.

The tires 2, 3 of the rear axle 6 are mounted using the method described in patent application WO 00/71365. According to this method, the axle 6 of the vehicle is designed to receive the tires 2, 3 through the intermediary of rings having a surface forming the tire bead receiving seat. The surface of these rings is advantageously frustoconical in shape. The receiving rings are themselves locked on the hub of the axle through the intermediary of locking rings, one part of whose surface is complementary in shape to that of recesses provided on said hub in which said locking rings are inserted.

According to the invention, the only essential function of the tire 3 is load bearing—it does not participate in the transmission of motive power. Such an embodiment consists in fixing the tire 3 on a system of the free wheeling type, which allows free rotation of said tire 3. When the vehicle follows a curved course, in particular on bends with a small radius of curvature, this embodiment allows it to follow its course without suffering from supplementary stresses due solely to its position on the axle, which causes it to follow a longer or shorter trajectory than the tires 2.

Tests were performed to show the service lives of an axle with four 59/80R63 tires according to the invention, fitted to the rear axle of a vehicle, only the axially inner tires transmitting the motive power, and an axle with four identical tires fitted on the rear axle of a similar vehicle, the four tires permanently transmitting the motive power.

The results obtained are shown below:

On a basis of 100, corresponding to the results obtained with the rear axle fitted with four tires permanently transmitting the motive power, the results show that the tires on a vehicle according to the invention have an average service life equivalent to 118 when only the axially inner tires of the rear axle transmit the motive power. The value of 118 compared with 100 indicates an 18% greater average service life.

It would appear that the results obtained according to the invention are distinctly better.

The invention may provide for the tire 4 mounted on the front axle 7 also to participate in transmission of the motive power. Furthermore, the fact that the tire 4 transmits part of the motive power may improve handling of the vehicle on curved trajectories. In fact, motive power transmitted partially by the tires of the front axle may facilitate following of the trajectory when these same tires are turned, in particular when the vehicle is loaded. It would appear, in fact, that under certain loading and travel conditions handling of such a vehicle over a curved trajectory, when fitted with four tires 2, 3 such as described above on the rear axle 6, two of them transmitting the motive power, is very difficult or indeed impossible, since the vehicle does not respond to the turning imposed by the tires of the front axle. These conditions may furthermore result in splitting and destruction of the tires of the front axle.

Another variant of the invention provides for the tires 4 on the front axle 7, participating in transmission of the motive power, to be controlled individually by electric motors. Such an embodiment makes it possible to facilitate variable, optionally progressive, transmission of the motive power through the intermediary of these tires 4 as a function of the trajectory followed by and the load status of said vehicle.

Figure 2:
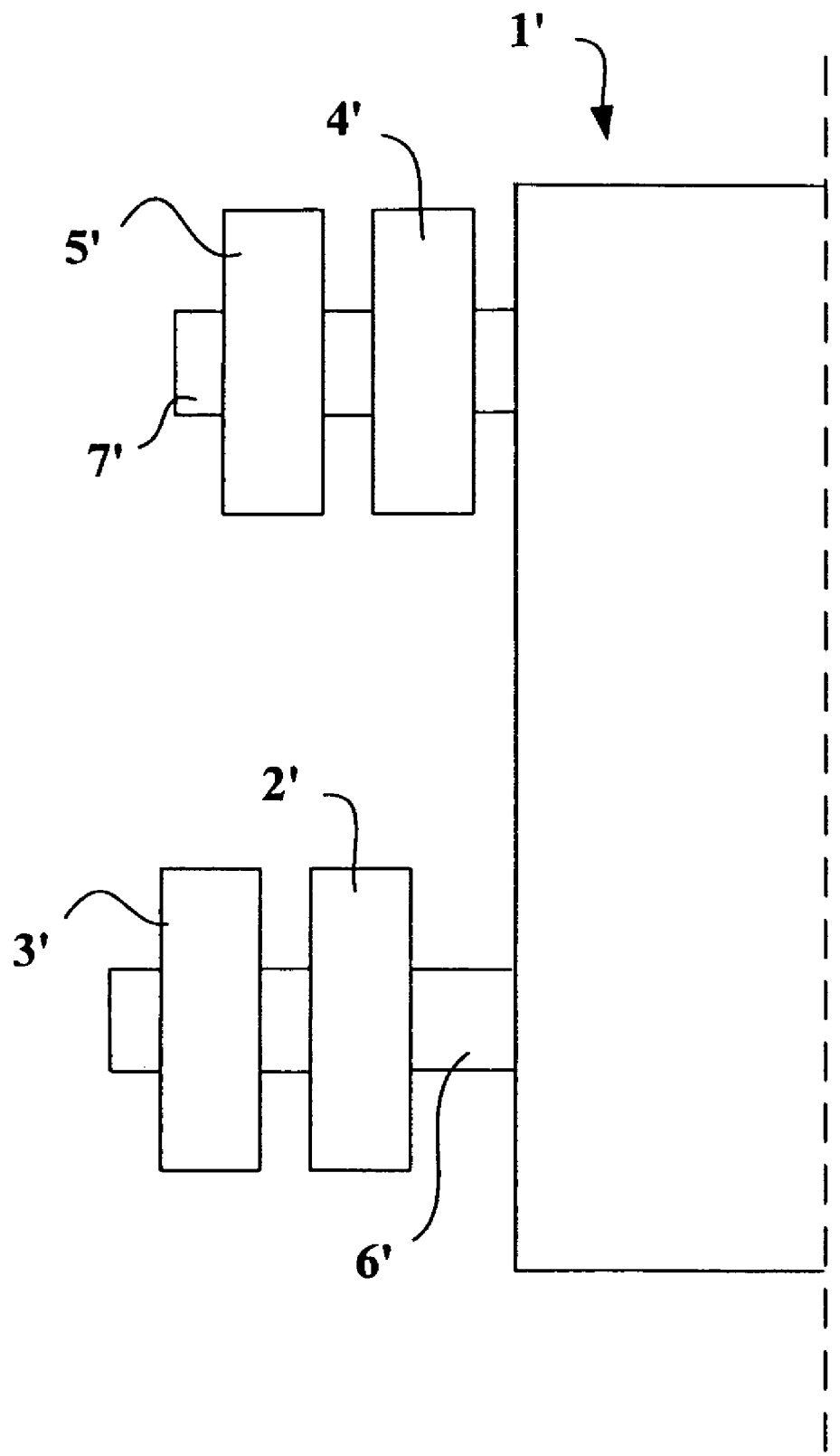
FIG. 2 shows a diagram, viewed from above, of a vehicle according to a second embodiment of the invention.

As shown schematically in FIGS. 1 and 2, it is also possible according to the invention to fit all the tires 2, 3 and 4 of the vehicle with electric motors 12, 13 and 14, respectively, which are supported by the respective axle hubs and disposed in the vicinity of the respective tires 2, 3 and 4, to allow variable, optionally progressive, transmission of motive power through the intermediary of each of the tires as a function of the trajectory followed by and the load status of said vehicle. Moreover, it is also possible to associate the tires 2 and 3 with rear braking devices 22 and 23, respectively, in order to limit wear to the tires 2 and 3 and to improve distribution of the wear, caused by braking, between the tires 2 and 3. Similarly, it is also possible to associate the tire 4 with a front braking device 24.

FIG. 2 illustrates another embodiment of a vehicle 1' according to the invention, which differs from the previous embodiment by the presence of a supplementary tire 5' mounted on the front axle 7', which is therefore a steering tire. The addition of this tire 5' makes it possible to distribute the load over more tires. Such an embodiment makes it possible, for example, to increase still further the loading capacity or alternatively to permit a reduction in the dimension of the tires.

An embodiment according to FIG. 2 also makes it possible to improve handling of the vehicle under conditions such as those mentioned above as being liable to result in splitting of the steering tires of the front axle 7'. In fact, the increase in number of tires makes it possible better to resist the stresses resulting in splitting and thus to succeed in imposing the change in direction.

In such an embodiment of a vehicle 1', the tire 5' may have the sole function of bearing part of the load. According to other variant embodiments, the tire 5' may participate in transmission of the motive power either permanently or temporarily, as mentioned above, or alternatively variably, for example by using electric motors.

The invention claimed is:

1. A heavy vehicle of a mass greater than 40 metric tons and operable to generate a motive power, comprising:
   a steerable first axle;
   at least two first tires mounted on the first axle;
   a second axle for transmitting at least part of the motive power, the second axle being spaced from the first axle; and
   four second tires mounted on the second axle,
   wherein at most two of the second tires are driving or motive power transmitting tires configured to transmit the at least part of the motive power,
   wherein each of the four second tires is associated with a respective braking device, and
   wherein the four second tires comprise two axially inner tires which are driving or motive power transmitting tires.

2. The vehicle of claim 1, wherein each of the first tires is associated with a respective braking device.

3. The vehicle of claim 1, wherein the first axle is a front axle and the second axle is a rear axle.

4. The vehicle of claim 1, wherein the at least two first tires are driving or motive power transmitting tires.

5. The vehicle of claim 1, wherein at least four first tires are mounted on the first axle, the at least four first tires comprising two axially inner tires which are driving or motive power transmitting tires.

6. The vehicle of claim 1, wherein each of the driving tires is controlled by an electric motor.

7. The vehicle of claim 1, wherein each of the first tires is directly mounted on the first axle without using a wheel, and wherein each of the second tires is directly mounted on the second axle without using a wheel.

8. A heavy vehicle of a mass greater than 500 metric tons and operable to generate a motive power, comprising:
   a steerable first axle;
   at least two first tires mounted on the first axle;
   a second axle for transmitting at least part of the motive power, the second axle being spaced from the first axle; and
   four second tires mounted on the second axle,
   wherein at most two of the second tires are driving or motive power transmitting tires configured to transmit the at least part of the motive power,
   wherein each of the four second tires is associated with a respective braking device,
   wherein each of the first and second tires has a diameter greater than 3.5 meters and an axial width greater than 37 inches, and
   wherein the four second tires comprise two axially inner tires which are driving or motive power transmitting tires.

9. The vehicle of claim 8, wherein each of the first tires is associated with a respective braking device.

10. The vehicle of claim 8, wherein the first axle is a front axle and the second axle is a rear axle.

11. The vehicle of claim 8, wherein the at least two first tires are driving or motive power transmitting tires.

12. The vehicle of claim 8, wherein at least four first tires are mounted on the first axle, the at least four first tires comprising two axially inner tires which are driving or motive power transmitting tires.

13. The vehicle of claim 8, wherein each of the driving tires is controlled by an electric motor.

14. The vehicle of claim 8, wherein each of the first tires is directly mounted on the first axle without using a wheel, and wherein each of the second tires is directly mounted on the second axle without using a wheel.

* * * * *